US00RE34847E

United States Patent [19]

Muderlak et al.

[11] E Patent Number: Re. 34,847

[45] Reissued Date of Patent: Feb. 7, 1995

[54] METERED AEROSOL FRAGRANCE DISPENSING MECHANISM

[75] Inventors: Kenneth J. Muderlak, Shorewood; Patrick D. Maloney, Madison, both of Wis.

[73] Assignee: Technical Concepts, Inc., Elk Grove Village, Ill.

[21] Appl. No.: 105,862

[22] Filed: Aug. 11, 1993

Related U.S. Patent Documents

Reissue of:

[64] Patent No.: 5,038,972
Issued: Aug. 13, 1991
Appl. No.: 412,937
Filed: Sep. 26, 1989

[51] Int. Cl.[6] ..... B67D 5/06

[52] U.S. Cl. ..... 222/25; 222/36; 222/649; 239/70; 239/71; 239/74

[58] Field of Search ..... 222/23, 25, 32, 36, 222/38, 644–649; 239/70, 75, 74, 71

[56] References Cited

U.S. PATENT DOCUMENTS

| | | | |
|---|---|---|---|
| Re. 29,117 | 1/1977 | Sahajian et al. | 222/70 |
| 2,686,944 | 8/1954 | Gubelin | 21/126 |
| 3,018,056 | 1/1962 | Montgomery . | |
| 3,139,218 | 6/1964 | Cairelli . | |
| 3,165,238 | 1/1965 | Wiley . | |
| 3,318,159 | 5/1967 | Cielaszyk . | |
| 3,587,332 | 6/1971 | Bell . | |
| 3,589,563 | 6/1971 | Carragan et al. | 222/70 |
| 3,633,881 | 1/1972 | Yurdin . | |
| 3,739,944 | 6/1973 | Rogerson . | |
| 3,949,241 | 4/1976 | Maute | 307/141 |
| 3,952,916 | 4/1976 | Phillips | 222/70 |
| 3,990,848 | 11/1976 | Corris . | |
| 3,993,444 | 11/1976 | Brown . | |
| 4,006,844 | 2/1977 | Corris . | |
| 4,007,755 | 2/1977 | Lerner et al. . | |
| 4,035,451 | 7/1977 | Tringali . | |
| 4,063,664 | 12/1977 | Meetze, Jr. | 222/70 |
| 4,098,853 | 7/1978 | Brown et al. . | |
| 4,166,087 | 8/1979 | Cline et al. . | |
| 4,271,092 | 6/1981 | Sullivan et al. . | |
| 4,276,236 | 6/1981 | Sullivan et al. . | |
| 4,301,095 | 11/1981 | Mettler et al. . | |
| 4,370,300 | 1/1983 | Mori et al. . | |
| 4,383,951 | 5/1983 | Palson . | |
| 4,483,466 | 11/1984 | Gutierrez . | |
| 4,601,886 | 7/1986 | Hudgins . | |
| 4,707,338 | 11/1987 | Spector . | |
| 4,719,851 | 1/1988 | Chesnut | 100/45 |
| 4,736,871 | 4/1988 | Luciani et al. | 222/25 |
| 4,743,406 | 5/1988 | Steiner et al. . | |
| 4,817,822 | 4/1989 | Rand et al. | 222/38 |
| 4,830,791 | 5/1989 | Muderlak et al. . | |
| 5,012,961 | 5/1991 | Madsen et al. | 222/643 |

FOREIGN PATENT DOCUMENTS

| | | |
|---|---|---|
| 3209698A | 3/1982 | Germany . |
| 1449448 | 9/1976 | United Kingdom . |
| 2080111A | 2/1982 | United Kingdom . |
| 2119499A | 11/1983 | United Kingdom . |

*Primary Examiner*—Gregory L. Huson
*Attorney, Agent, or Firm*—Welsh & Katz, Ltd.

[57] ABSTRACT

An apparatus and controlling circuitry for periodically operating an aerosol container in discrete dispensing intervals to disperse a discrete quantity of the contents thereof. The apparatus includes a powered mechanism for actuating the aerosol, with the circuitry controlling the powered mechanism for a predetermined number of actuations. An energizing means activates a warning mechanism when the actuation count reaches the predetermined number to thereby indicate the probable total evacuation of the aerosol container and the necessity for termination of the operation. The apparatus also includes means for setting the circuitry into a plurality of different operating modes, including a continuous intermittent operation, a controlled daytime operation, and a controlled night operation. The apparatus may be battery operated, and it then includes a second warning mechanism for indicating whether the battery power is sufficient to operate the powered mechanism.

34 Claims, 4 Drawing Sheets

METERED AEROSOL FRAGRANCE DISPENSING MECHANISM

Matter enclosed in heavy brackets [ ] appears in the original patent but forms no part of this reissue specification; matter printed in italics indicates the additions made by reissue.

BACKGROUND OF INVENTION

This invention relates to devices utilized in public facilities for dissipation of malodoriferous aromas due to any of several conditions. In the past, various solid materials were utilized which sublimated and thereby dispersed the normally overpowering substitute odor for that found in the public place. In order to enhance the dispersion of such sublimating materials, many suppliers developed and began supplying powered fan devices which assisted in the wide flow of odor covering material. Similarly, the chemists worked on odor suppressing materials which directly worked on the destruction of the odor causing materials dispersed in the atmosphere, particularly where pets were encountered.

Such devices can be found readily in the prior art. For example, the common assignee of the present invention has a pending patent application, Ser. No. 07/162,021, Filed Feb. 19, 1988, *now U.S. Pat. No. 4,830,791,* entitled "IMPROVED ODOR CONTROL DEVICE". Other such solid dispersing devices are found in the patents to: Corris U.S. Pat. No. 3,990,848; Sullivan et al U.S. Pat. No. 4,271,092; Tringali U.S. Pat. No. 4,035,451; and Sullivan et al U.S. Pat. No. 4,276,236.

In the field of odor control devices where a pressurized aerosol container is utilized, the patents include Corris U.S. Pat. No. 4,006,844; Rogerson U.S. Pat. No. 3,739,944; Meetze U.S. Pat. No. 4,063,664; Cairelli U.S. Pat. No. 3,139,218; Wiley U.S. Pat. No. 3,165,238; Cielaszyk U.S. Pat. No. 3,318,159; Montgomery U.S. Pat. No. [3,01,056] *3,018,056*; Bell U.S. Pat. No. 3,587,332; Phillips U.S. Pat. No. 3,952,916 and Guitierrez U.S. Pat. No. 4,483,466.

SUMMARY OF THE INVENTION

The present invention is a unique and economically constructed apparatus for the periodic actuation of an aerosol container under a controlled environment.

It is an object of the present invention to provide an apparatus and circuitry that will accurately count the number of times that a spray is actuated and [to] initiate a signal when a predetermined number is reached to indicate that the spray is nearing the end of its useful life.

Another object of this invention is to provide an independently contained power source in the form of batteries to power the actuation thereof and to provide means for measuring such batteries and advising when they are low or totally dissipated.

Still another object of the present invention is to provide a light sensing means which will control operation under varying modes of operation, including both a day and a night mode along with a continuous mode.

A further object is to provide means to advise when the aerosol container is nearing an empty condition, to provide means for giving an adjustable time parameter for the intervals of disbursement, as well as being able to adjust the termination point, and to provide means to reset the device when a full aerosol *container* replaces a dissipated aerosol *container.*

Other objects will become apparent when the specification is read in the light of the attached drawings where an illustrative example is disclosed.

DETAILED DESCRIPTION OF THE INVENTION

Figure 1:
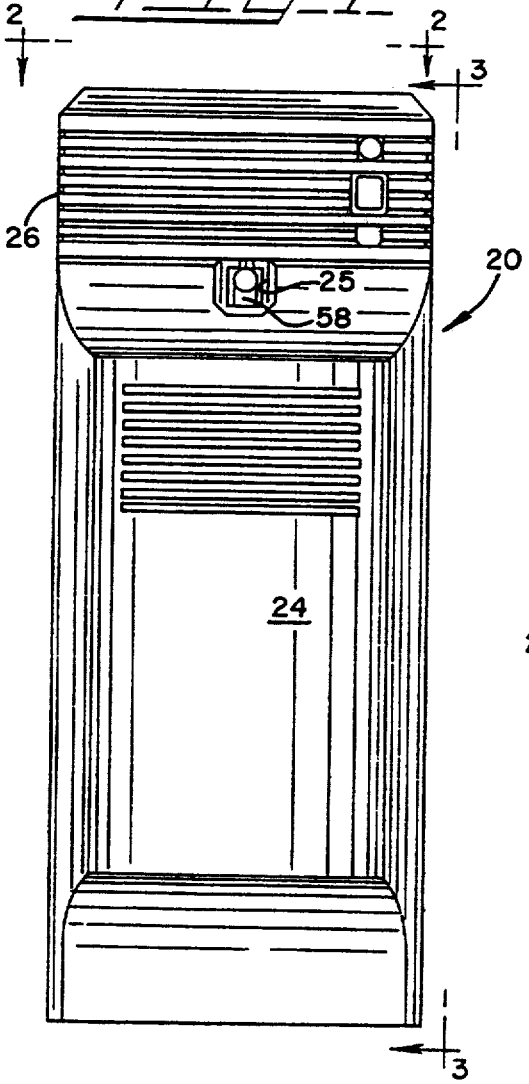
FIG. 1 is a front elevational view of the housing containing the device contemplated by the present invention.
Figure 3:
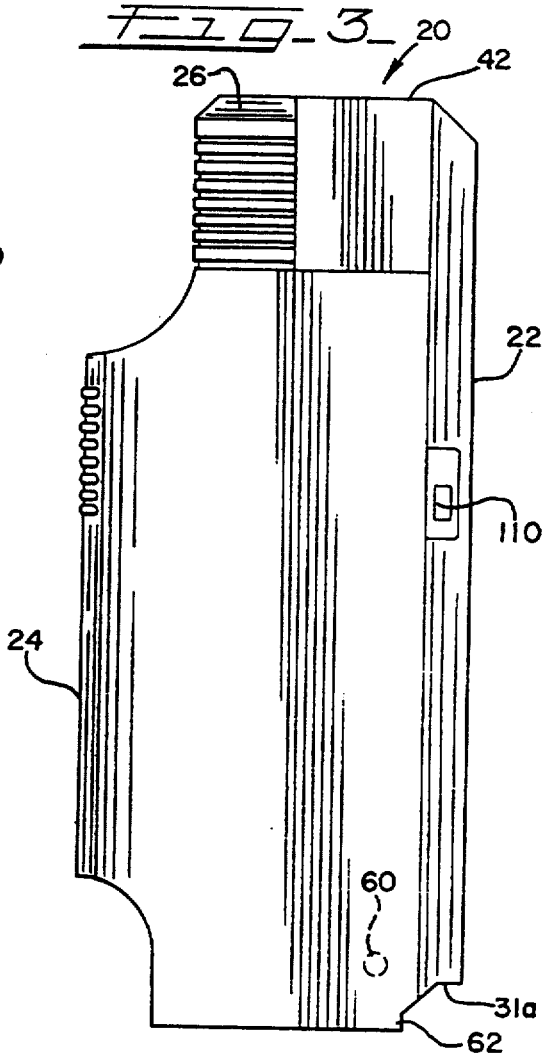
FIG. 3 is a right side elevational view of the housing taken along viewing line 3—3 of FIG. 1.
Figure 2:
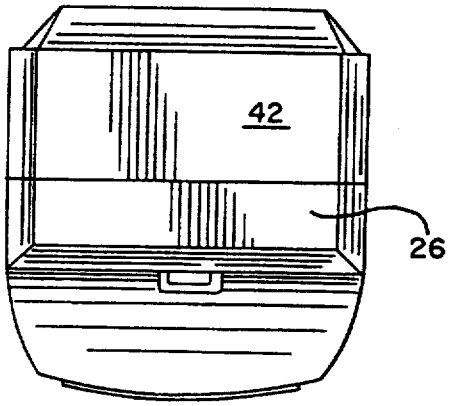
FIG. 2 is a top view of the housing taken along viewing line 2—2 of FIG. 1.

Referring now to the drawings, and particularly to FIGS. [1–4,] *1–5,* wherein similar parts are designated by similar numerals, the improved fragrance dispensing mechanism 20 includes a substantially rigid body portion 22, a hinged lower front cover 24, and an upper front cover 26. The rigid body portion 22 includes a bottom 30, a shelf 32 spaced from bottom 30 and forming a lower chamber 34, and an upper barrier means 36 spaced from shelf 32 forming the major central chamber 38, as well as forming the upper chamber 40 formed between the barrier means 36 and the top 42. Rib means 44 and 45 along with shelf 32 serve to support and locate the pressurized aerosol can 50, containing the frangrance to be dispensed. The can 50 includes the normal pressure retaining top 52 including the dispensing valve (not shown) and the axially extending spring loaded stem tube 54 communicating with the valve and having a spray forming actuating button 56 positioned on the free end of the stem tube 54. Button 56 preferably includes right angularly arranged exhaust tube means 58 for directing the spray outwardly through aperture 25 in the cover 24.

Figure 4:
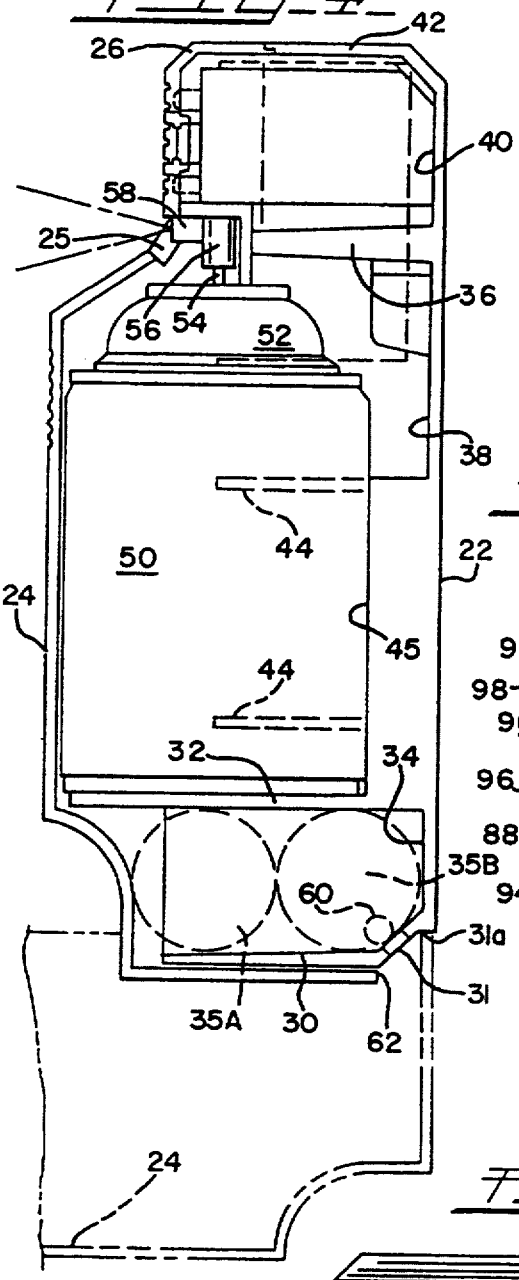
FIG. 4 is a right side elevational view, similar to FIG. 3, but shown schematically in partial section, presenting the disposition of the aerosol container within the housing and showing a partial phantom side view of the lower front cover of the housing in its downward hinged position.
Figure 5:
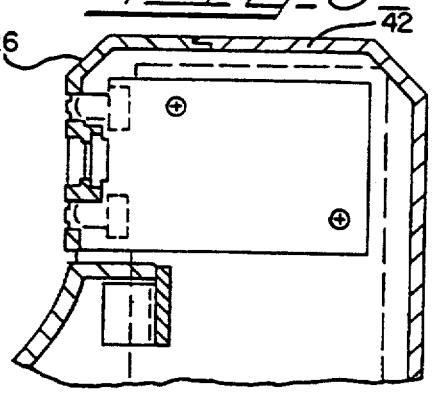
FIG. 5 is a partial side [elevation] *elevational* view, presented schematically in partial section, showing the snap fastening means whereby the hinged lower front cover is retained in closed relation to the rigid portion of the housing.

The lower chamber 34 is arranged to accomodate a pair of D-Cells 35A and 35B. The bottom 30 tapers upwardly in its rear extremity, as at 31, and terminates in a shoulder means 31a. The lower front cover 24 is basically an open rectangularly shaped cover having front, side and bottom walls, with the side walls provided with complimentary means 60 for cooperation with mating means in the sidewall of body 22, not shown, to act as pivot or hinge means to permit the front lower cover 24 to assume the opened position shown in phantom in FIG. 4. The lower rear edge 62 of cover 24 is adapted to engage the shoulder means 31a to form a stop and thereby restrict the further lowering of the cover 24, which lowering provides access to the central and lower chambers [34 and 38,] *38 and 34*, respectively.

Figure 6:
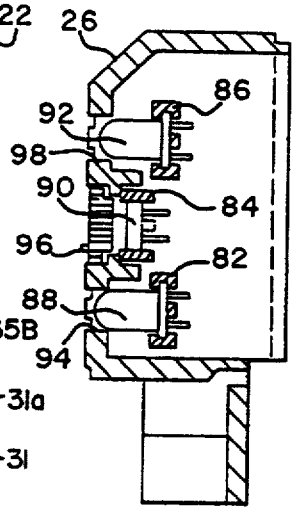
FIG. 6 is a partial side elevational view, presented schematically in partial section, showing the disposition of the warning and sensing means within the front upper cover means of [said] *the* housing.
Figure 8:
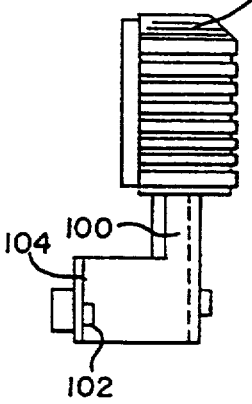
FIGS. 8 and 9 are the left and right elevational views, respectively, of the upper housing or cover means of the device as shown in FIG. 7.
Figure 7:
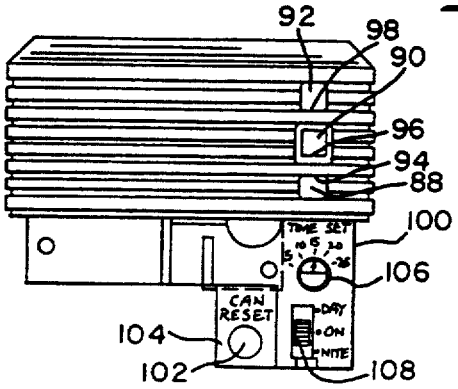
FIG. 7 is a front elevational view of the upper cover means showing the disposition of the upper battery warning LED, the middle light sensing means, the lower empty can warning LED and the items normally hidden by the lower hinged cover, i.e., the interval time adjustment means, the reset switch means, and the day-on-nite switch means.
Figure 9:
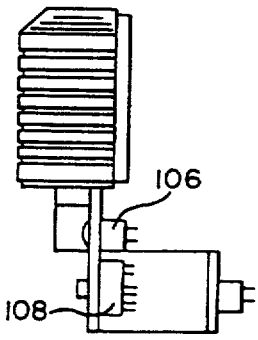
Figure 10:
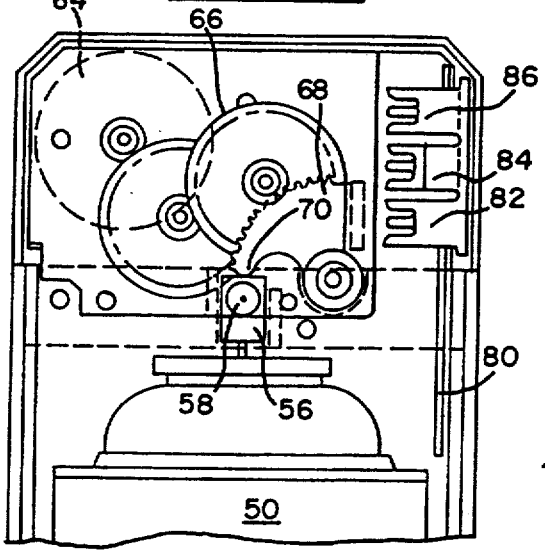
FIGS. 10 and 11 are the schematic front and top views, respectively, of one embodiment of *the* actuating means for operation of the [contemplated] invention.
Figure 11:
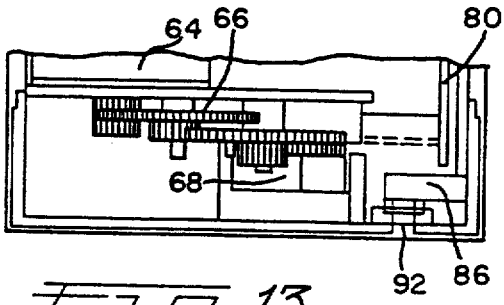

The left portion of upper chamber 40, as viewed in FIGS. 10 and 11, is adapted to house the motor 64 and power transmission means 66 ending in actuating means 68, such as a segment gear or the like and appropriate cam means 70 for engaging and activating the spring loaded spray button 56. The balance of the chamber is utilized in housing an LED/PC drawer. This latter includes printed circuit board 80 cooperating with three receptacles 82, 84 and 86 to accomodate and mount two light emitting diodes 88 and 92 in the lower and upper positions, respectively, and a light sensor 90 intermediate the LEDs, as best seen in FIG. 6. Each of these three items, the LEDs and the sensor, communicate with the ambient through appropriate apertures 94, 96 and 98, respectively, in the upper body cover 26, as shown in FIGS. 6 and 7. The circuitry on the printed circuit board will be discussed hereinafter.

Referring now to FIGS. 6–9, the upper front cover 26 includes a depending portion 100 adapted to carry a plurality of control devices, such as a reset button 102 mounted on a set back flange 104; a time interval switch 106; and an operating mode switch 108, the latter providing three settings for continuously on, intermittently on (day) and [continuously] *intermittently* off [(nite)]0 (*night*). Suitable lead means extend outwardly from the back of each switch for appropriate engagement with one of the PC boards.

Figure 13:
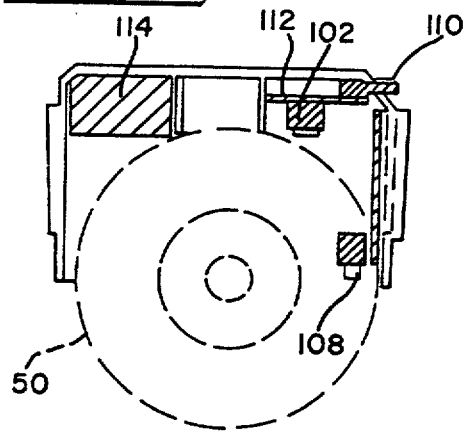
FIGS. 12, 13, and 14 are respectively a schematic partial front [elevation] *elevational view* of the housing of this device, a schematic top plan view thereof, and a schematic right side elevational view thereof, showing the disposition of the printed circuit, the light emitting diodes (LEDs), the motor, the switches and one of the batteries used for the circuit.
Figure 12:
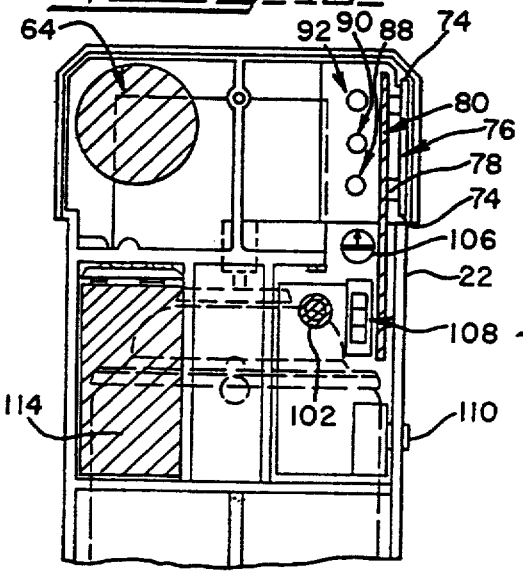
Figure 14:
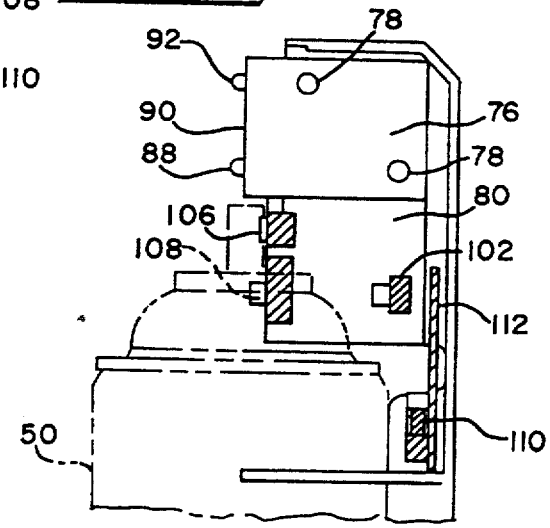

A master on-off switch 110 is mounted on an appropriate PC board 112 (FIGS. 12–14), and the operating button of switch 110 extends outwardly through the side wall of the body 22 so-as to be available to the outside. Positioned below the motor 64 and transmission means 66; and behind the aerosol can 50 is a 9 volt battery 114 for purposes best set forth hereinafter.

Figure 15:
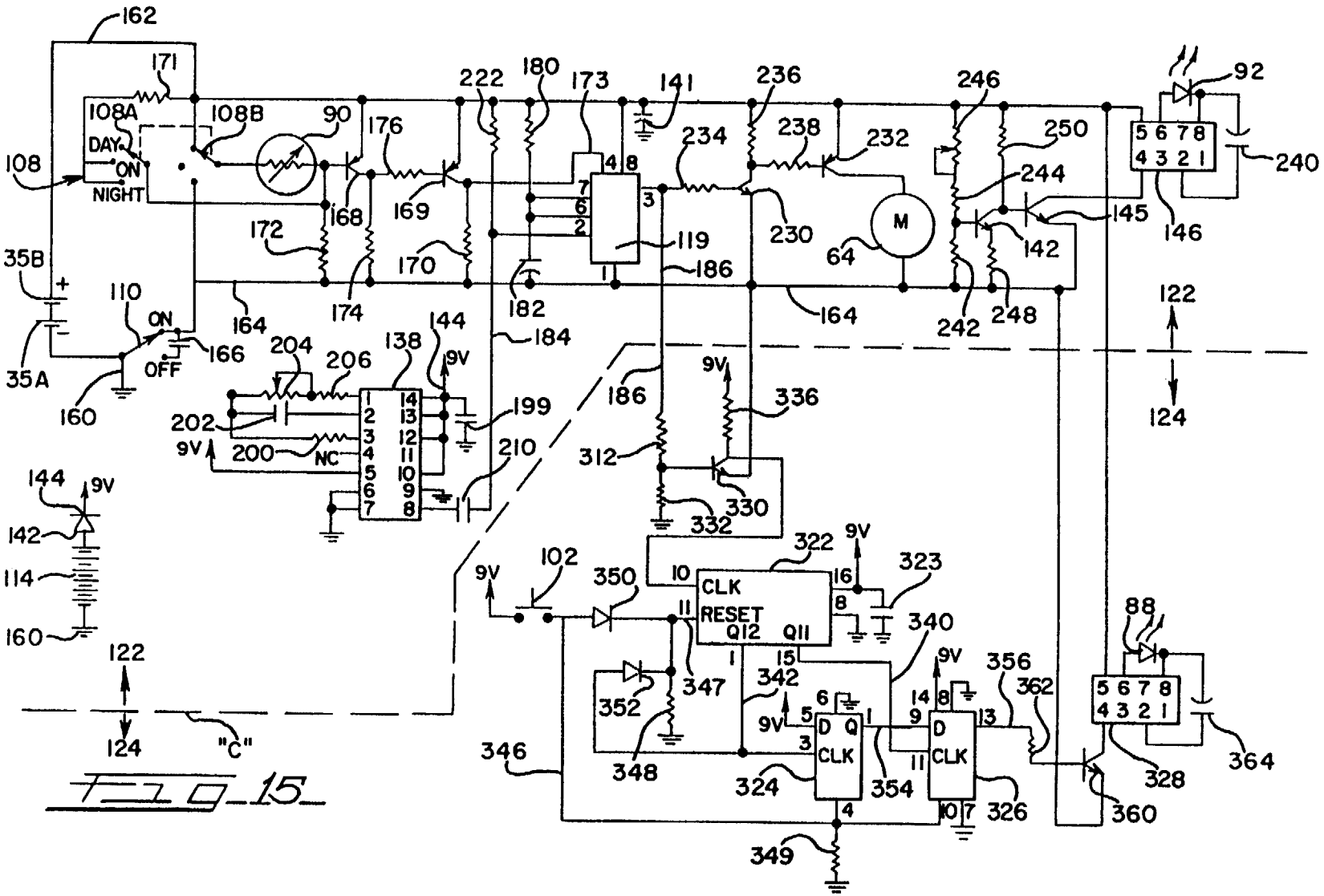
FIG. 15 is a *schematic* diagram of one embodiment of a circuit that can be utilized [to operate] *with* the present invention.

Referring now to FIG. 15, the sensor and motor control circuit 122 controls fragrance pump operation to optimize the life of both the fragrance material in the aerosol fragrance container and the batteries 35A and 35B while the pump generation counting circuit 124 provides a visual indication that the aerosol fragrance container 50 has probably been exhausted. Operating circuit 122 is located above the dashed line "C" in FIG. 15, while counting circuit 124 is located below that line. The circuit 122 contains timing devices which limit each actuation of the fragrance pump motor 64 to a short period (approximately 0.6 seconds), and which provide a 15-minute (*adjustable*) waiting interval between each pump actuation. In addition, the circuit provides a visual indication that the circuit 122 is switched "ON" and battery voltage is adequate for operation.

In brief, an on-off switch 110 controls power to the circuit from two 1½ volt D-cells 35A, 35B. A separate mode switch 108 selects one of three available modes of operation: "on", "night," or "day". In "on" mode, the fragrance pump operates for a brief period [on] *between* 15-minute intervals regardless of room light conditions. The fifteen (15) minute interval is adjustable within the parameters of approximately five (5) minutes to twenty-five (25) minutes. [In "night" mode, the fragrance pump is disabled regardless of room light conditions.] In "day" mode, cadmium-sulfide photocell 90 is used to sense room light conditions. When room light exceeds a predetermined threshold, the fragrance pump operates according to the above-described timing. When room light is less than the predetermined threshold, the fragrance pump is disabled. *The "night" mode operation is the reverse of the "day" mode operation, i.e., the pump operates only when the room light is below a predetermined threshold.* IC 138 contains an oscillator and divider chain and it produces a 1/900 Hz signal (i.e. one cycle every 15 minutes) which is [)] used to control the interval between actuations of the fragrance pump. IC 119 is a timer device which produces a 0.6 sec pulse used to control the length of each actuation of the fragrance pump. Transistors 142 and 145 form a voltage sensor which determines whether the D-cells 35A, 35B have sufficient energy to power the unit. IC 146 is controlled by transistor 145 and causes a visual indicator 92 to flash when switch 110 is "ON" and the D cells have sufficient energy. Conversely, the visual indicator 92 is not energized when the D cells have insufficient energy and must be replaced. A separate 9 volt battery 114 supplies power for the operation of IC 138 and a fragrance container empty indicator circuit 124.

In greater detail, two D-cells 35A and 35B wired in series provide one power supply for the circuit 122. The cathode of D-cell 35A is connected to primary ground 160. The anode of D-cell 35B is connected to a positive 3 V supply lead 162. The anode of D-cell 35A is connected to the cathode of D-cell 35B. Each D-cell has a nominal output voltage when "fresh" of 1.5 V, so that this series wiring provides +3.0 V to the +3 V supply conductor 162.

All circuit devices which use the +3 V supply lead 162 also use a secondary ground lead 164 as a return path. Power switch 110 is a single-pole, double-throw switch which connects or disconnects the secondary ground lead 164 to primary ground 160. In the ON position, switch 110 connects the secondary ground lead 164 directly to primary ground 160. In the OFF position switch 110 interposes capacitor 166, a 0.1 uF disc capacitor, between primary and secondary grounds 160, 164 to minimize transient pulses which may occur when power is switched off.

A separate 9 volt battery 114 supplies for IC 328 and the fragrance container empty indicator 88. The cathode of battery 114 is connected to ground 160. The anode of this battery is connected to the anode of a rectifier diode 142 (preferably type 1N4001) to prevent damage from an incorrectly inserted battery. The cathode of diode 142 is connected to the +9 V supply lead 144.

Mode switch 108 is a double-pole, triple-throw switch used to select one of the three available operating modes: ON, DAY, or NIGHT. The operating mode determines the conditions under which the fragrance pump may operate. The three modes provide a continuous intermittent operation (ON), a controlled daytime operation (DAY), and a controlled night operation (NIGHT). In the ON position, the pump operates for a 0.6 sec period every 15 minutes. As was previously mentioned above, the interval between such operating periods can be adjusted to various parameters, i.e. between approximately 5 minutes and 25 minutes, to meet the needs of the locale. In the DAY position, room light is sensed, and if it exceeds a predetermined threshold, the pump operates according to the previously discussed timing. In the night position, the pump [is disabled.] *operates only if room light is below the predetermined threshold.*

The circuitry associated with mode switch 108 is used to control the bias on the base of PNP transistor 168 which, in turn, is used to control a timer IC 119 that drives the fragrance pump. When transistor 168 is on (conducting), timer IC119 is disabled, when transistor 168 is off (non-conducting), timer IC 119 is enabled. Therefore, the mode switch circuitry will be described from the perspective of its effect on this transistor 168.

In the ON position, mode switch pole 108A connects the base of transistor 168 to the +3 V supply 162 through a 2.2K resistor 171. [Mode] *Since mode* switch pole 108B [connects] *is open,* the base of transistor 168 *is also connected* to secondary ground 164 through 100K resistor 172. Resistors 171 and 172 thus form a voltage divider between +3 V supply 162 and secondary ground 164, which establishes the bias voltage on the base of transistor 168. The emitter of transistor 168 is connected to +3 V supply 162. Because the resistance of 2.2K resistor 171 is much less than 100K resistor 172, the bias voltage is close to +3 V, and transistor 168 is biased off. As will be explained later, when transistor 168 is non-conducting, timer IC 119 is enabled, and the fragrance pump operates normally.

In the DAY position, mode switch pole 108A is open. Mode switch pole 108B connects the base of transistor 168 to the +3 V supply 162 through a CdS photocell 90. The base of transistor 168 is also connected to secondary ground 164 through 100K resistor 172. Photocell 90 and 100K resistor 172 thus form a voltage divider between +3 V supply 162 and secondary ground 164, which establishes the bias voltage on the base of transistor 168. Photocell 90 responds to light. In the absence of light, its resistance is relatively high, but when exposed to light, the photocell resistance decreases substantially. The emitter of transistor 168 is connected to +3 V supply 162.

When the photocell 90 is deprived of light, as in a dark room, its resistance is high. The voltage applied to the base of transistor 168 is sufficiently lower than the +3 V supply 162 to which the emitter of that transistor is connected, so the transistor is biased on. When transistor 168 is conducting, timer IC 119 is disabled, and the fragrance pump is inhibited. When the photocell 90 is exposed to light, as in a lighted room, its resistance is low. The voltage applied to the base of transistor 168 is then sufficiently close to +3 V so that the transistor is biased off. When transistor 168 is non-conducting, timer IC 119 is enabled, and the fragrance pump operates normally.

In the NIGHT position, mode switch pole 108A connects the base of transistor 168 to +3 V supply 162 through 2.2K resistor 171. Mode switch pole 108B connects the base of transistor 168 to secondary ground 164 through [100K resistor 172 an] cadmium sulfide (CdS) photocell 90 [in parallel.] *which is then in parallel with 100K resistor 172. In a lighted room, the voltage applied to the base of transistor 168 is sufficiently low to bias the transistor on, thereby disabling timer IC 119 and inhibiting the fragrance pump.*

PNP transistors 168 and 169 form a pair of cascaded inverting switches which couple the previously described mode switch and light sensing circuitry to the active-low reset signal 173 for timer IC 119. (When reset signal 173 is active, the output of timer IC 119 is inhibited, and the fragrance pump cannot operate.) 10K resistor 174 connects the collector of transistor 168 to secondary ground 164 and acts as a collector load. 4.7K resistor 176 couples the collector of transistor 168 to the base of transistor 169. The emitter of transistor 169 is connected to +3 V supply 162. 2.2K resistor 170 connects the collector of transistor 169 to secondary ground 164 and acts as a collector load. The reset signal 173 for timer IC 119 is connected to the collector of transistor 169.

When transistor 168 is biased off, the base of transistor 169 is essentially coupled to ground via resistors 174 and 176 for a total resistance of 14.7K. Current flows out of the base of transistor 169 causing it to conduct. Transistor 169 collector current causes a voltage drop across resistor 170, and reset signal 173 for timer IC 119 assumes a high level, its inactive state. Thus, when transistor 168 is biased off, timer IC 119, and the fragrance pump it controls, operate normally.

When transistor 168 is biased on, the base of transistor 169 is essentially coupled to the +3 V supply 162, causing it to switch off. Reset signal 173 for timer IC 119 is pulled down to secondary ground 164 by resistor 170 and is thus at a low level, its active state. When reset signal 173 is active, the output of timer IC 119, and the fragrance pump it controls, is inhibited.

Timer IC 119 is a commercially available 7555 CMOS timer IC used in its monostable or "one-shot" mode. Timer 119 is connected to +3 V supply 162 and secondary ground 164. A 10 [IF] *uF* electrolytic capacitor 141 is connected between +3 V supply 162 and secondary ground 164 near IC 119 to bypass switching transients. When timer 119 receives a trigger pulse on its active-low trigger input 184, it produces a brief active-high output pulse on its output line 186 (provided reset signal 173 is inactive). The length of the output pulse is approximately 0.6 sec. and is a function of an R C time constant determined by 680K resistor 180 and 1 uF capacitor 182. This output pulse is amplified and used to drive fragrance pump motor 64.

Timer IC 119 receives trigger pulses generated by oscillator-divider IC 138 on approximately 15-minute intervals IC 138 is a commercially available MC 14541 CMOS oscillator-divider device. IC 138 receives power from the +9 V supply lead 144. A 0.1 uF disk capacitor 199 is used to bypass switching transients generated in IC 138 to ground. The oscillator portion of IC 138 uses a 150K resistor 200, a 0.1 uF disk capacitor 202, a 100K variable resistor 204 and a 47K resistor 206 to determine the oscillator frequency. The oscillator output is available at pin 3 of IC 138. An internal connection is provided in IC 138 to a divider chain which divides the oscillator frequency. Variable resistor 204 should be adjusted to produce an oscillator frequency of 31.2 Hz, in order to produce an output frequency of 1/900 Hz (i.e. one cycle per 15-minute interval).

The output of oscillator-divider IC 138 appears on pin 8 as a 1/900 Hz square-wave. A characteristic of timer IC 119 is that once triggered, the trigger input must be negated before the output will be negated. Used directly, the output of oscillator-divider IC 138 would provide a 450 sec trigger pulse, which would interfere with the proper operation of timer IC 119. A 0.1 uF disk capacitor 210 couples the output of IC 138 to the trigger input 184 of timer IC 119, to narrow the trigger pulse to a period much shorter than IC 119's time constant of 0.6 sec. 22K resistor 222 is used as a pull-up resistor between trigger input 184 and +3 V supply 162.

Thus timer IC 119 receives a trigger pulse from IC 138 once every 15 minutes, and when not disabled by the mode switch and light sensing circuitry, it produces in response to 0.6 sec. output pulse used to drive fragrance pump motor 64. This output pulse is available on pin 3 of IC 119 (lead 186). NPN transistor 230 (type 2N3904) and PNP transistor 232 (type 2N4403) are cascaded to amplify timer IC 138 output 186 to provide sufficient current to operate fragrance pump motor 64. A 200 Ohm resistor 234 couples timer IC 138 output 186 to the base of transistor 230. A 10K resistor 236 couples the collector of transistor 230 to +3 V supply 162 and serves as a load resistor. A 100 ohm resistor 238 couples the collector of transistor 230 to the base of transistor 232. Fragrance pump motor 64 is connected as a load between the collector of transistor 232 and secondary ground 164.

Light emitting diode (LED) driver IC 146 operates an LED indicator 92 to show that power switch 110 is ON and D-cells 35A, 35B are sufficiently fresh to operate the fragrance pump motor 64 and associated circuitry 122. IC 146 is a commercially available type LM3909 flasher-driver circuit which alternately supplies power to and removes power from LED 92, causing it to flash. Capacitor 240 (47 uF, electrolytic) determines the rate at which LED 92 flashes, Flasher IC 146 obtains its positive power supply from the +3 V supply 162.

Flasher 146 obtains its negative power supply from secondary [round] *ground* 164 through transistor 145. This permits transistors 142 and 145, arranged to sense the voltage on the +3 V supply 162, to enable flasher 146 only when this voltage exceeds a predetermined threshold. A 39K resistor 242, a 1K resistor 244, and a 1K variable resistor 246 form a voltage divider that sets the bias on the base of NPN transistor 142 to determine the switching threshold. The charge-voltage relationships of commercial D-cells vary according to the chemical system and construction used. Variable resistor 246 permits adjustment of the threshold according to the type of D-cell in use. A 1K resistor 248 couples the emitter of transistor 142 to secondary ground 164. A 100K resistor 250 couples the collector of transistor 142 to the +3 V supply 162. The collector of transistor 142 directly drives the base of transistor [144] *145*.

The Pump Operation Counting Circuit 124 provides a visual indication that the fragrance container probably has been exhausted. This circuit counts operations of the fragrance pump, and operates a visual indicator 88 after 3072 such operations.

In brief, IC 322 is a multi-stage binary counter which counts each fragrance pump operation pulse from timer IC 119 and supplies a binary value representing the number of received pulses on its output terminals. Devices 324 and 326 are D-type flip-flops which recognize when counter 324 has received 3072 pulses. If the mode switch 108 is set for continuous operation, assuming an interval of 15 minutes per pulse, 3072 pulses represent a period of 32 days. When this event occurs, flip-flop 326 turns on flasher IC 328. IC 328 is a commercially available circuit which alternately supplies power to and removes power from the light emitting diode (LED) indicator 88, causing it to flash.

In more detail, counter IC 322 receives output pulses from timer IC 119 through NPN transistor 330. Timer IC 119 operates from the +3 V supply 162 [(a 0.1 μF disk capacitor 323 eliminates switching transients)], but counter IC 322 operates from the +9 supply 144 (*a 0.1 μF disk capacitor 323 eliminates switching transients*). Transistor 330 shifts output pulses from IC 119 to a level compatible with the clock input of IC 322. A 2.2K resistor 312 and a 22K resistor 332 form a voltage divider to couple the output signal 186 from IC 119 to the base of transistor 330. A 100K resistor 336 couples the collector of transistor 330 to the +9 V supply and serves as a load. The collector of transistor 330 is connected to the clock input of counter IC 322.

IC 322 is a commercially available type MC14040 *12*-stage binary counter circuit. Counter 322 presents a binary value equal to the number of pulses received from timer 119 on its output terminals. In this circuit, only output bits 11 (signal 340) and 12 (signal 342) are needed; the other available outputs are unused. Devices 324 and 326 are each half of a commercially available type MC14013 dual D-type flip-flop IC, used to recognize that counter 322 has reached 3072 counts.

Switch 102, a momentary contact switch, is actuated by the user to reset the 3072-count interval. When actuated, this switch asserts signal 346, resetting counter 322 and flip-flops 324 and 326. Diodes 350 and 352 provide isolated reset signal 347 to counter 322 to prevent damage to output transistors in counter 322 when switch [324] *102* is actuated. Resistors 349 and 348 are pull-down resistors which negate signals 346 and 347 respectively when the switch [324] *102* is not actuated. Starting from its initialized state, counter 322 counts pulses from timer 119. When counter 322 has received 2048 pulses, it asserts output bit 12 (signal 342), causing flip-flop 324 to propagate data from its wired-high D input to the output. This asserts signal 354, the D input of flip-flop 326. When counter 322 has received [3072] *1024 more* pulses, it asserts output bit 11 (signal 340), causing flip-flop 326 to clock the "high" on its D input to the output, asserting signal 356 *after a total of 3072 pulses.*

IC 328, a commercially available type LM3909 flasher circuit, obtains its negative power supply from secondary ground 164 through transistor 360. Asserted signal 356 from flip-flop 326 provides drive current through resistor 362 to the base of transistor 360, causing it to conduct and enabling flasher 328. Flasher circuit 328 alternately supplies power to and removes power from LED 88, causing it to flash. Capacitor 364 determines the rate at which LED 88 flashes. Flasher 328 obtains its positive power supply from the +3 V supply 162.

While other embodiments will become apparent to those skilled in the art, it is the intent that this application be limited solely by the appended claims.

We claim:

1. An apparatus and controlling circuitry for periodically operating an aerosol container at discrete dispensing intervals to disperse a discrete quantity of the aerosol contents thereof *into the atmosphere as a spray*, including powered means for periodically actuating an aerosol dispensing means of said container, said circuitry controlling said powered means , [for a predetermined number of actuations, and first warning means for indicating the probable total evacuation of container contents and the necessity for termination of said dispensing operation when the actuation count reaches said predetermined number], and further including mode switching means for setting said circuitry into a plurality of different operating modes, said plurality of different operating modes comprising at least three modes, including a continuous intermittent operation, a controlled daytime operation *responsive to the relative presence of ambient light*, and a controlled night operation *responsive to the relative absence of ambient light.*

2. Apparatus of the type claimed in claim 1 wherein said apparatus includes internal power source means for activating said powered means periodically to dispense said aerosol, means for measuring the power of said internal power source means, and [second] warning means for indicating whether said measured power is sufficient to activate said powered means.

3. Apparatus of the type claimed in claim 1 wherein said continuous intermittent operation provides an unbroken series of intermittent disbursements of aerosol spray material from said aerosol dispensing means regardless of the presence or absence of ambient light surrounding said apparatus [until total evacuation of said container contents is reached].

4. Apparatus of the type claimed in claim 1 wherein said apparatus includes means for measuring the intensity of ambient light, and said controlled daytime operation mode [includes circuitry which] provides said periodic actuation of said aerosol dispensing means *only* in the presence of ambient light having an intensity exceeding a predetermined threshold.

5. Apparatus of the type claimed in claim 1 wherein said apparatus includes an ambient light sensing means for measuring the intensity of ambient light, and said controlled night operation mode [includes circuitry which] provides [inactivation] *said periodic actuation* of said aerosol dispensing means *only* in the presence of ambient light having an intensity less than a predetermined threshold.

6. Apparatus of the type claimed in claim 1 wherein said powered means includes a motor operatively coupled to a power transmission unit for sending periodic power to a cam unit, [and a] *said* cam unit operatively coupled to said power transmission unit for periodically engaging said dispensing means on said aerosol container for releasing the contents [in] *of* said container at said discrete dispensing [internals] *intervals.*

7. Apparatus of the type claimed in claim 1 wherein said apparatus and controlling circuitry are contained within a rigid housing openable at the front, said housing having a front cover openably fastened in assembled relation to the lower end of said housing, said housing further including an upper cover containing a plurality of apertures for exposing light sensing means [and said warning means].

8. Apparatus of the type claimed in claim [1] *26* wherein said circuitry includes a reset switch for reactivating said first warning means when a dissipated aerosol container is replaced with a full container.

9. Apparatus of the type claimed in claim [1] *26* wherein said first warning means comprises a light emitting diode.

10. Apparatus of the type claimed in claim [1] *26* wherein said circuitry includes means for establishing a new predetermined number of actuations and termination of dispensing operation.

11. Apparatus of the type claimed in claim 7 wherein said housing further includes a platform spaced from the top and bottom of said housing for supporting an aerosol container, and rib means integral within said housing for embracing and rigidly locating said aerosol container.

12. Apparatus for the type claimed in claim 11 wherein the upper interior of said housing includes said circuitry, a motor operatively coupled to a power transmission unit for sending periodic power to a cam unit, [and a] *said* cam unit operatively coupled to said power transmission unit for periodically engaging said dispensing means on said aerosol container, and cavities within said housing containing battery devices for actuating said motor and said circuitry.

13. Apparatus of the type claimed in claim 1 wherein said circuitry includes means for adjusting the time interval between periodic actuations of said aerosol dispensing means.

14. Apparatus of the type claimed in claim 13 wherein the time interval can be adjusted between predetermined limits.

15. An apparatus and controlling circuitry for periodically operating an aerosol container at discrete dispensing intervals to disperse a discrete quantity of the aerosol contents thereof, including powered means for periodically actuating an aerosol dispensing means of said container, said circuitry controlling said powered means for a predetermined number of actuations and including means *for* counting the actuations, and first energizing means coupled to first warning means for energizing said first warning means when the actuation count reaches said predetermined number to thereby indicate the probable total evacuation of container contents and the necessity for termination of said dispensing operation, and further including mode switching means for setting said circuitry into a plurality of different operating modes, said plurality of different operating modes comprising at least three modes, including a continuous intermittent operation, a controlled daytime operation, and a controlled night operation.

16. Apparatus of the type claimed in claim 15 wherein said apparatus includes internal power source means for activating said powered means periodically to dispense said aerosol, means for measuring the power of said internal power source means, and second energizing means coupled to second warning means for energizing said second warning means to indicate whether said measured power is sufficient to activate said powered means.

17. Apparatus of the type claimed in claim 15 wherein said continuous intermittent operation provides an unbroken series of intermittent disbursements of aerosol spray material from said aerosol dispensing means regardless of the presence or absence of ambient light surrounding said apparatus until total evacuation of said container contents is reached.

18. Apparatus of the type claimed in claim 15 wherein said apparatus includes means for measuring the intensity of ambient light, and said controlled daytime operation mode [includes circuitry which] provides said periodic actuation of said aerosol dispensing means in the presence of ambient light having an intensity exceeding a predetermined threshold.

19. Apparatus of the type claimed in claim 15 wherein said apparatus includes an ambient light sensing means for measuring the intensity of ambient light, and said controlled night operation mode [includes circuitry which] provides inactivation of said aerosol dispensing means in the presence of ambient light having an intensity [less] *greater* than a predetermined threshold.

20. Apparatus of the type claimed in claim 15 wherein said powered means includes a motor operatively coupled to a power transmission unit for sending periodic power to a cam unit, [and a] *said* cam unit operatively coupled to said power transmission unit for periodically engaging said dispensing means on said aerosol container for releasing the contents in said container at said discrete dispensing [internals] *intervals.*

21. An apparatus and controlling circuitry for periodically [operating] *actuating* an aerosol container at discrete dispensing intervals to disperse a discrete quantity of the aerosol contents thereof *into the air, said apparatus* including powered means for periodically actuating an aerosol dispensing means of said container, said circuitry including means *for* counting the actuations of said powered means for a predetermined number of actuations, and first energizing means coupled to first warning means for energizing said first warning means when the actuation count reaches said predetermined number to thereby indicate the probable total evacuation of container contents and the necessity for termination of said dispensing operation, and further including mode switching means for setting said circuitry into a plurality of different operating modes, said plurality of different operating modes comprising at least three modes, including a continuous intermittent operation, a controlled daytime operation, and a controlled night operation.

22. Apparatus of the type claimed in claim 21 wherein said apparatus includes internal power source means for activating said powered means periodically to dispense said aerosol, means for measuring the power of said internal power source means, and second energizing means coupled to second warning means for energizing said second warning means to indicate whether said measured power is sufficient to activate said powered means.

23. Apparatus of the type claimed in claim 21 wherein said continuous intermittent operation provides an unbroken series of intermittent disbursements of aerosol spray material from said [aerosol dispensing means] *container* regardless of the presence or absence of ambient light surrounding said apparatus until total evacuation of said container contents is reached.

24. Apparatus of the type claimed in claim 21 wherein said apparatus includes means for measuring the intensity of ambient light, and said controlled daytime operation mode [includes circuitry which] provides said periodic actuation of said aerosol dispensing means *only* in the presence of ambient light having an intensity exceeding a predetermined threshold.

25. Apparatus of the type claimed in claim 21 wherein said apparatus includes an ambient light sensing means for measuring the intensity of ambient light, and said controlled night operation mode [includes circuitry which] provides [inactivation] *actuation* of said aerosol dispensing means *only* in the presence of ambient light having an intensity less than a predetermined threshold.

*26. Apparatus of the type claimed in claim 1 wherein said controlling circuitry includes means for controlling said powered means for a predetermined number of actuations, and first warning means for indicating the probable total evacuations of container contents and the necessity for termination of said dispensing operation when the actuation count reaches said predetermined number.*

*27. Apparatus of the type claimed in claim 1 wherein said mode switching means includes a three-position switch which is accessible to the user of said apparatus.*

*28. Apparatus of the type claimed in claim 27 wherein said circuitry includes a timer for repeatedly activating said powered means in said three modes of operation and a photocell for providing a signal in response to the intensity of ambient light, and wherein said three-position switch is configured to change the response of said timer to said photocell signal.*

*29. An apparatus for introducing a chemical substance from a container into the environment surrounding the container, said apparatus comprising: powered means for evacuating the chemical substance from the container when activated, circuit means for measuring the intensity of ambient light and for controlling said powered means such that said powered means is actuated only at certain ambient light intensities and only at certain times, and mode switching means for setting said circuit means into a plurality of different operating modes, said plurality of different operating modes comprising at least three distinct modes, including a continuous operation mode, a controlled daytime operation mode, and a controlled nighttime operation mode.*

*30. Apparatus of the type claimed in claim 29 wherein said chemical substance is introduced into the surrounding atmosphere as a spray.*

*31. Apparatus of the type claimed in claim 29 wherein said apparatus is an odor control device, wherein said powered means is periodically activated in said three modes, and wherein said circuit means includes means for adjusting the waiting interval between periodic activations within the range of approximately 5 minutes to approximately 25 minutes.*

*32. Apparatus of the type claimed in claim 29 wherein said continuous operation mode provides an unbroken series of periodic actuations of said powered means regardless of the presence or absence of ambient light surrounding said apparatus.*

*33. Apparatus of the type claimed in claim 29 wherein said controlled daytime operation mode provides periodic actuation of said powered means only in the presence of ambient light having an intensity exceeding a predetermined threshold.*

*34. Apparatus of the type claimed in claim 29 wherein said controlled nighttime operation mode provides periodic actuation of said powered means only in the presence of ambient light having an intensity less than a predetermined threshold.*

* * * * *